United States Patent
Valenza et al.

(10) Patent No.: US 12,267,120 B2
(45) Date of Patent: *Apr. 1, 2025

(54) THREE-DIMENSIONAL VISUALIZATION OF WI-FI SIGNAL PROPAGATION THROUGH MULTIPLE FLOORS

(71) Applicant: Cisco Technology, Inc., San Jose, CA (US)

(72) Inventors: Salvatore Valenza, Pomy (CH); Samer Salam, Beirut (LB); Taha Hajar, Chavannes-Renens (CH); Nikodin Ristanovic, Lausanne (CH); Arun G. Khanna, Sunnyvale, CA (US); Matthew Aaron Silverman, Shaker Heights, OH (US); James Florwick, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,688

(22) Filed: Sep. 25, 2023

(65) Prior Publication Data
US 2024/0014913 A1    Jan. 11, 2024

Related U.S. Application Data

(63) Continuation of application No. 17/481,916, filed on Sep. 22, 2021, now Pat. No. 11,777,625.
(Continued)

(51) Int. Cl.
*H04B 17/391*    (2015.01)
*G06T 15/06*    (2011.01)
(Continued)

(52) U.S. Cl.
CPC .......... *H04B 17/391* (2015.01); *G06T 15/06* (2013.01); *G06T 15/08* (2013.01);
(Continued)

(58) Field of Classification Search
CPC ....... H04B 17/391; G06T 15/06; G06T 15/08; H04W 28/0819; H04W 36/0077; H04W 72/29; H04W 84/12
See application file for complete search history.

(56) References Cited

U.S. PATENT DOCUMENTS

| 6,711,148 B1 | 3/2004 | Hills |
| 2003/0014233 A1 | 1/2003 | Rappaport et al. |

(Continued)

FOREIGN PATENT DOCUMENTS

JP    2007306454 A    11/2007

*Primary Examiner* — Jianye Wu
(74) *Attorney, Agent, or Firm* — Polsinelli P.C.

(57) ABSTRACT

The present technology is directed to visualizing a Wi-Fi access point (AP) signal propagation pattern through multiple floors. The present technology can execute a Wi-Fi signal propagation model corresponding to a first AP on a first floor of a building plan and a second AP on a second floor of the building plan. The Wi-Fi signal propagation model calculates a Wi-Fi signal propagation pattern for a plurality of APs including the first AP and the second AP. The present technology can further present a visualization of the Wi-Fi signal propagation pattern for the plurality of APs, wherein the Wi-Fi signal propagation pattern for the first AP on the first floor of the building plan projects onto the second floor of the building plan.

20 Claims, 9 Drawing Sheets

Related U.S. Application Data

(60) Provisional application No. 63/224,343, filed on Jul. 21, 2021.

(51) Int. Cl.
| | | |
|---|---|---|
| *G06T 15/08* | (2011.01) | |
| *H04W 28/08* | (2023.01) | |
| *H04W 28/086* | (2023.01) | |
| *H04W 36/00* | (2009.01) | |
| *H04W 72/29* | (2023.01) | |
| *H04W 84/12* | (2009.01) | |

(52) U.S. Cl.
CPC ... *H04W 28/0865* (2023.05); *H04W 36/0077* (2013.01); *H04W 72/29* (2023.01); *H04W 84/12* (2013.01)

(56) References Cited

U.S. PATENT DOCUMENTS

2015/0142391 A1    5/2015  Flynn et al.
2017/0272965 A1*  9/2017  Kumar .................. H04W 24/04

\* cited by examiner

THREE-DIMENSIONAL VISUALIZATION OF WI-FI SIGNAL PROPAGATION THROUGH MULTIPLE FLOORS

CROSS-REFERENCE TO RELATED APPLICATIONS

This application is a continuation of U.S. Non-Provisional application Ser. No. 17/481,916 filed on Sep. 22, 2021, which in turn claims priority to U.S. provisional application No. 63/224,343 filed on Jul. 21, 2021, all of which are expressly incorporated by reference herein in their entirety.

TECHNICAL FIELD

The subject matter of this disclosure relates in general to the field of wireless networks, and more particularly, to systems and methods for visualizing a Wi-Fi access point (AP) signal propagation pattern through multiple floors.

BACKGROUND

With growing interest in optimizing the wireless network infrastructure to improve the wireless network performance, various wireless network planning tools are available for analyzing, visualizing, and troubleshooting the wireless signal propagation (e.g., Wi-Fi coverage) of the wireless network. A visualization of the wireless signal propagation can help understanding the signal propagation (i.e., assessing the signal propagation behavior) and validating the signal propagation based on signal level measurements from APs and sensors so that an optimized wireless network can be designed, for example, as to where to place or how to configure Wi-Fi APs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
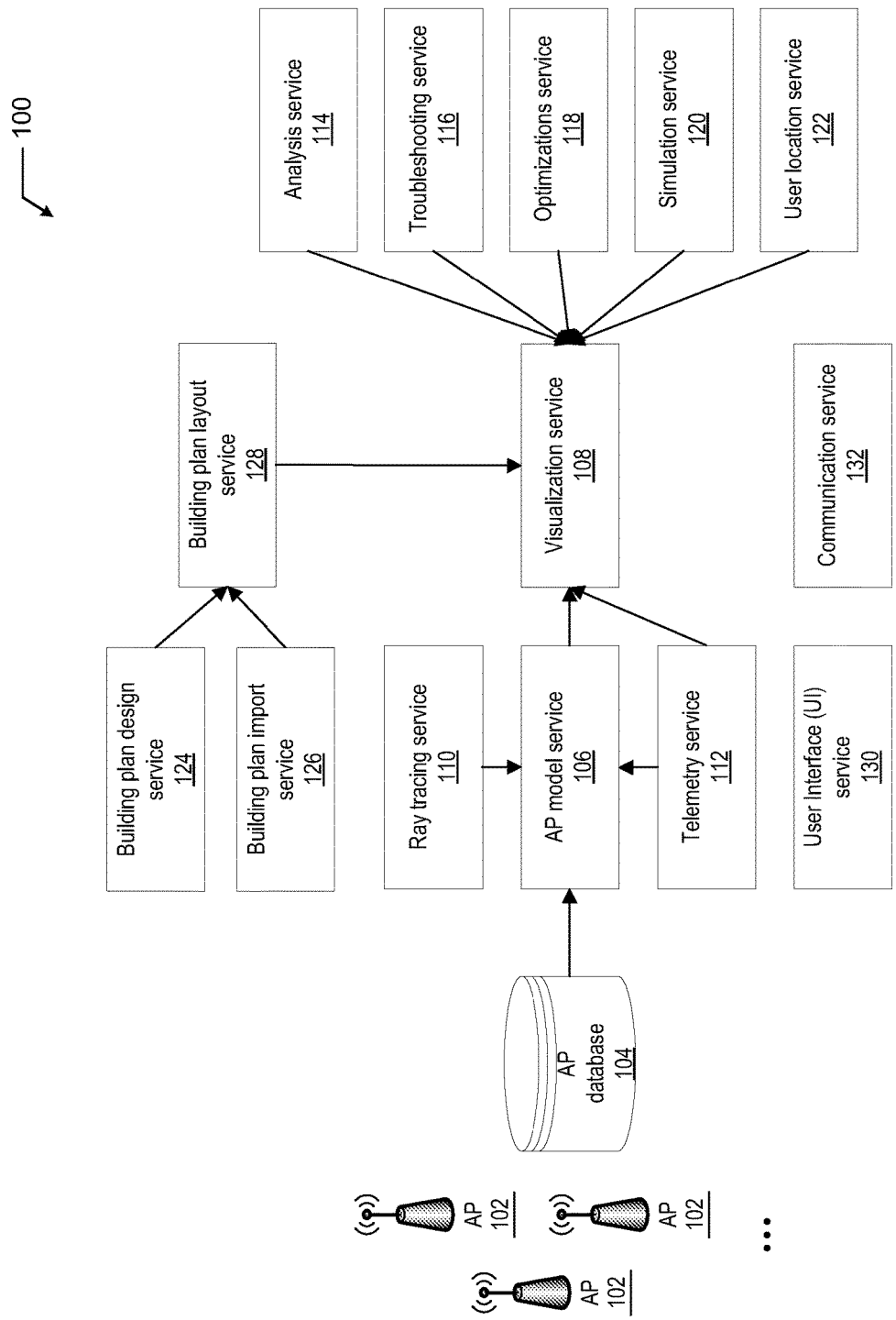
FIG. 1 illustrates an example visualization system for presenting a wireless signal propagation in 3-D according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Various wireless network planning tools are available for analyzing, simulating, visualizing, and troubleshooting wireless signal propagation (i.e., Wi-Fi coverage) of a wireless network. Most of the tools provide a simulation of Wi-Fi coverage by predicting a wireless signal strength and signal propagation on a single floor, typically by predicting the wireless signal propagation at one height and filling the entire 3-D volume uniformly.

However, such approximations cannot provide an accurate and reliable visualization of the wireless signal propagation. For example, in a building plan with multiple floors, the wireless signal propagation on the current floor can experience noise or interferences caused by APs or objects located on the other floors such as a floor above or a floor below. Such noise or interferences can particularly affect the Wi-Fi coverage and network performance near the ceiling or the ground of the current floor.

As such, a single plane of Wi-Fi coverage cannot accurately reflect the network performance throughout the floor in 3-D. A dynamic network environment can be more accurately visualized when any interference or impact from other floors is also considered.

Therefore, there exists a need for 3-D visualization of the Wi-Fi AP signal propagation pattern through multiple floors. The present technology includes systems, methods, and computer-readable media for solving these problems and discrepancies. Specifically, systems, methods, and computer-readable media for providing a 3-D visualization of a Wi-Fi signal propagation (i.e., Wi-Fi coverage) through multiple floors are provided in the present disclosure.

Overview

The present technology includes systems, methods, and computer-readable media are provided for visualizing a Wi-Fi AP signal propagation pattern through multiple floors.

According to at least one example of the present technology, a method includes executing a Wi-Fi signal propagation model corresponding to at least one first AP on a first floor of a building plan and at least one second AP on a second floor of the building plan. The method further includes presenting a visualization of the Wi-Fi signal propagation pattern for a plurality of APs including the first AP on the first floor and the second AP on the second floor.

In particular, the Wi-Fi signal propagation model calculates a Wi-Fi signal propagation pattern for the plurality of APs including the first AP and the second AP. Also, the Wi-Fi signal propagation pattern for the first AP on the first floor of the building plan projects onto the second floor of the building plan.

In another example, a system for visualizing a Wi-Fi signal propagation pattern through multiple floors (e.g., 3-D signal propagation visualization system) is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the one or more processors (e.g., a visualization service) to execute a Wi-Fi signal propagation model corresponding to a first AP on a first floor of a building plan and a second AP on a second floor of the building plan and present a visualization of the Wi-Fi signal propagation pattern for the plurality of AP.

A non-transitory computer-readable storage medium having stored therein instructions which, when executed by one or more processors (e.g., a visualization service), can cause the one or more processors to execute a Wi-Fi signal propagation model corresponding to a first AP on a first floor of a building plan and a second AP on a second floor of the building plan and present a visualization of the Wi-Fi signal propagation pattern for the plurality of APs.

The Wi-Fi signal propagation model calculates a Wi-Fi signal propagation pattern for a plurality of APs including the first AP and the second AP. The present technology can further present a visualization of the Wi-Fi signal propagation pattern for the plurality of APs, wherein the Wi-Fi signal propagation pattern for the first AP on the first floor of the building plan projects onto the second floor of the building plan

DESCRIPTION

FIG. 1 illustrates an example 3-D signal propagation visualization system 100 for presenting a wireless signal propagation in 3-D according to some aspects of the disclosed technology. As shown in FIG. 1, the 3-D signal propagation visualization system 100 can include one or more services primarily responsible for examining and analyzing signals from a plurality of access points (APs) 102A, 102B, 102C, . . . (collectively, 102), determining a signal propagation pattern for the APs 102 based on a signal propagation model, and providing a 3-D visualization of the signal propagation pattern including analysis, troubleshooting, simulations, or optimizations of the signal propagation pattern.

The 3-D signal propagation visualization system 100 can include an AP database 104 that includes information about the plurality of APs 102, which are configured to transmit wireless communication signals. In some aspects, the information about the plurality of APs 102 can include, but is not limited to a location of APs 102 and their orientation (e.g., azimuth and elevation angles), a model number, a signal strength, end-of-life data, an antenna type, a channel, a frequency (band), or network information of which the APs 102 belong.

The 3-D signal propagation visualization system 100 can include an AP model service 106 that is a collection of signal propagation models for different types of AP antennae 102. In some examples, the signal propagation model includes a description of the signal propagation pattern based on the information associated with the AP antennae 102. For example, such information can be provided by the AP database 104 or related to parameters derived from various configuration attributes and measurements such as transmission power (txPower), signal-to-noise ratio (SNR), Key Performance Indicator (KPI) values, or Received Signal Strength Indication (RSSI) values.

The 3-D signal propagation visualization system 100 can include a visualization service 108 configured to perform 3-D modeling, i.e., display a 3-D visualization of the signal propagation pattern based on the signal propagation model, the antenna pattern of the Wi-Fi AP, the configuration of the Wi-Fi AP (txPower, azimuth angle, elevation, band and channel) and the geometry of space as defined in a building plan. In some examples, the visualization service 108 can display the 3-D visualization of the signal propagation in the form of a heatmap, which uses color-coding to represent different values of the signal strength. In some instances, the visualization service 108 can generate a time-based (temporal) visualization where changes in the signal propagation pattern over time can be presented in the 3-D visualization.

The 3-D signal propagation visualization system 100 can also include a ray tracing service 110 configured to perform ray tracing from a particular AP. In some examples, the ray-tracing service 110 can compute attenuation based on the line-of-sight from a particular AP to a certain vertex in space. For example, ray tracing can be used to visualize the signal propagation by tracing paths of electromagnetic waves and simulating the way that the waves interact with any objects it may hit. If a straight line is drawn from a particular AP and does not hit anything in the space, then the signal propagation model works in a straightforward manner. On the other hand, if there is an obstacle (e.g., a wall, shelving, ceiling, etc.) along the path, the signal propagation pattern can be broken into multiple segments since the signal propagation pattern can change depending on the properties of the obstacle that the pattern has to pass through.

The 3-D signal propagation visualization system 100 can include a telemetry service 112 configured to collect and record data from the plurality of APs 102 or sensors on the floor pertaining to the APs 102 in space. In some examples, the telemetry data can be used to update information about a particular AP (e.g., model, antenna type, etc.) or feed into the visualization service 108 to provide an optimized 3-D visualization instead of relying on a predicted model. In some instances, the telemetry service 112 can utilize the telemetry data to validate a certain predicted model.

The 3-D signal propagation visualization system 100 can also include an analysis service 114 that is configured to analyze data associated with the wireless coverage such as SNR measurements, latency measurements, a number of client devices associated with each of the APs, KPI values, txPower measurements, or RSSI measurements. In some instances, the analysis service 114 can further perform analysis pertaining to data associated with one or more errors or constraints of the APs 102 that can impact the wireless coverage.

The 3-D signal propagation visualization system 100 can include a troubleshooting service 116 configured to perform various types of troubleshooting by isolating and root-causing issues or errors relating to the network performance and signal propagation pattern based on the APs 102 and providing suggestions to resolve such issues or errors. In some examples, the troubleshooting service 116 can identify both cause and consequences of the issues, for example, obstructions in the line of sight, a level of signal coverage, a number of client devices connected to APs, co-channel interference, or stickiness of roaming clients to APs.

The 3-D signal propagation visualization system 100 can include an optimization service 118 configured to provide a 3-D visualization of the optimized signal propagation pattern that provides better operational signal coverage and lower interference. In some examples, the optimization service 118 can provide an upgrade option for the APs or configuration settings to achieve improved network performance. In some instances, the optimization service 118 can provide the optimized 3-D visualization that illustrates dynamic changes as conditions in the network change. In some examples, the optimization service 118 can propose different optimized layouts by radio spectrum (RF) or deployment of the APs for a given space.

The 3-D signal propagation visualization system 100 can also include a simulation service 120 configured to simulate various scenarios relating to deployment of APs, potential network failures, estimated RF leakage, or alternative network configurations. In some instances, the simulation service 120 can provide a simulated 3-D visualization of the various proposed layouts provided by the optimization service 118.

In some examples, the simulation service 120 can provide a simulated 3-D visualization illustrating the impact of an alternative deployment of APs, for example, how the signal propagation pattern is impacted by deploying a new or upgraded AP at different locations on the floor. Also, the simulation service 120 can simulate a 3-D visualization based on the impact of an upgrade or different AP upgrade strategies prior to the actual update to observe and compare the wireless coverage.

Furthermore, a type of materials of obstructions in the space can significantly impact the signal propagation pattern. The simulation service 120 can provide a simulated visualization of the signal propagation pattern depending on the type of materials of obstacles such as walls or shelving, or what is stored on shelving (e.g., liquid, metal, non-metal, etc.).

Additionally, the simulation service 120 can provide a simulated 3-D visualization illustrating potential network failures. For example, the simulation service 120 can help define coverage zones to avoid coverage blackout zones in common.

The 3-D signal propagation visualization system 100 can also include a user location service 122 configured to identify a location of a user (e.g., client device) and obtain data associated with the user/client device to determine the signal propagation pattern. For example, a client density can significantly affect the wireless network coverage.

In some examples, the user location identified by the user location service 122 can be combined with an AP coverage so that the 3-D visualization can include the impact of the client device such as an operating system of client devices, client device density, or any RF interference due to the presence of RF-emitting device (e.g., mobile phones, cordless phones, wireless security cameras, etc.).

In some examples, the user location service 122 can help to optimize the latency and the signal propagation pattern by identifying the location of client devices and the type of services that the client devices are performing. For example, too many client devices performing VoIP calls on the same AP can worsen the network performance and cause a bad call quality due to latencies. The 3-D visualization of the signal propagation pattern can include the user location provided by the user location service 122 to illustrate such impact of the client devices on the wireless network coverage.

The 3-D signal propagation visualization system 100 can also include a building plan design service 124 configured to allow a user to manage the settings of the building plan or the floor plan of the space (e.g., layout, objects, viewpoint, etc.).

The 3-D signal propagation visualization system 100 can include a building plan import service 126 configured to import a building plan or a floor plan. The building plan or the floor plan can be in any suitable format, for example, a Building Information Modeling (BIM) file or a Computer-Aided Design (CAD) file. In some examples, the building plan import service 126 can import the building plan or the floor plan that contains a technical drawing, blueprint, schematic, or 3-D rendering of the floor that is to be visualized in 3-D.

In some instances, the signal propagation pattern can be overlaid over the building plan or the floor plan provided by the building plan import service 126. Depending on the type of the imported file for the building plan, details of the building or the floor such as a type of materials of the obstacles (e.g., a wall, etc.) or location of APs or sensors can further be included in the building plan.

The 3-D signal propagation visualization system 100 can also include a building plan layout service 128 configured to store the building plan layout and support the 3-D visualization of the building plan layout. In some examples, the building plan layout service 128 can perform the function of a management and control platform for managing, monitoring, and storing data associated with the visualization based on the building plan.

The 3-D signal propagation visualization system 100 can also include a user interface service 130 configured to allow a user to manage and control settings of the visualization or network configurations to optimize the 3-D visualization. For example, the settings can include a viewpoint (e.g., a first-person perspective, an orbit view, or a bird's eye view), layout, parameters (e.g., txPower, SNR measurements, KPI values, RSSI values, etc.), or visualization options. Also, the examples of network configurations can include but are not limited to elevation or azimuth angle of APs, deployment of APs, band and a type of network or APs.

In some instances, the user interface service 130 can provide information to or receive feedback from the user via a communication service 132 as further described below. In some examples, the user may be asked to evaluate and manage various suggestions proposed by the troubleshooting service 116 or the optimization service 118.

The 3-D signal propagation visualization system 100 can also include a communication service 132 configured to transmit and receive information wirelessly over a network. In some examples, the communication service 132 can send and receive communications from/to a building plan system (not shown) that may provide building plan updates. In some instances, the communication service 132 can transmit and receive data from/to a user for analyzing, troubleshooting, simulating, or optimizing the 3-D visualization of the signal propagation pattern.

Figure 2:
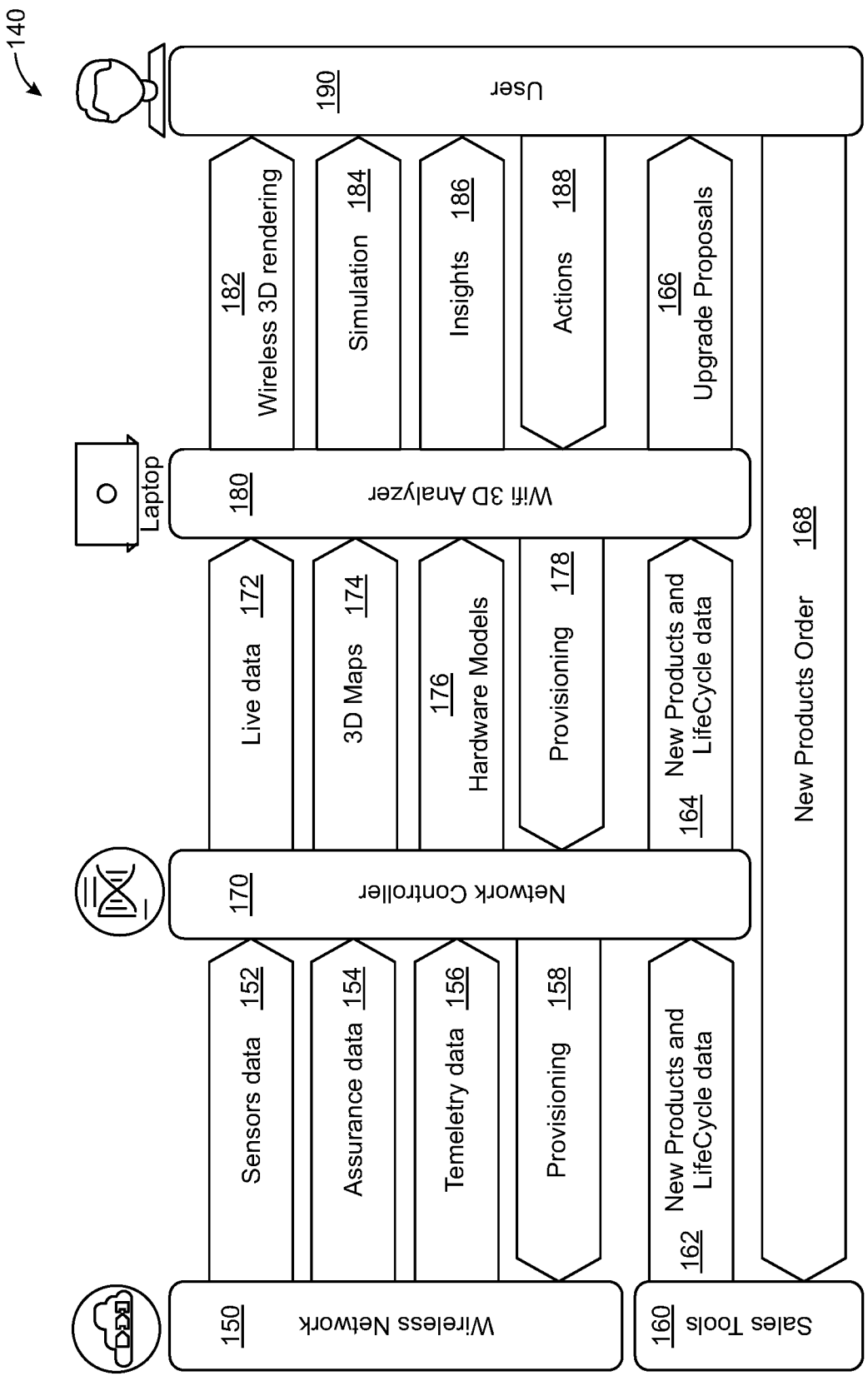
FIG. 2 illustrates an example network architecture of a visualization system for presenting a wireless signal propagation in 3-D according to some aspects of the disclosed technology.

FIG. 2 illustrates an example network architecture 140 for the 3-D signal propagation visualization system 100 illustrated in FIG. 1 according to some aspects of the disclosed technology. The network architecture 140 comprises a wireless network 150, sales tools 160, a network controller 170, a Wi-Fi 3D analyzer 180, and a user 190. In some embodiments, Wi-Fi 3D analyzer 180 executes on a client device and takes advantage of hardware acceleration capabilities from a graphics processor, but Wi-Fi 3D analyzer 180 can operate in other environments such as a server or on a device with only general processing capabilities, or in a cloud environment. Even though the network controller 170 and Wi-Fi 3D analyzer 180 are illustrated as separate components in FIG. 2, in some examples, they can be a single device (i.e., the Wi-Fi 3D analyzer 180 is run on the network controller 70 itself) or run in a virtualized cloud environment.

The wireless network 150 comprises APs 102 illustrated in FIG. 1, sensor(s), and user devices. The network controller 170 can include AP database 104, AP model service 106, telemetry service 112, user location service 122, building plan design service 124, building plan import service 126, and building plan layout service 128, all of which are illustrated in FIG. 1. The Wi-Fi 3D analyzer 180 can include visualization service 108, analysis service 114, troubleshooting service 116, optimizations service 118, simulation service 120, and user interface service 130, all of which are also illustrated in FIG. 1.

The wireless network 150 can transmit sensor data 152, assurance data 154, and/or telemetry data 156 to the network controller 170. The network controller 170 can store such received data and can provide user interfaces and APIs for receiving network configurations and updates. Network configurations can be used to provision 158 various devices in wireless network 150. Also, the network controller 170 can transmit live data 172, 3-D maps 174 (e.g., 3-D building plans or floor plans), and/or hardware models 176 to the Wi-Fi 3D analyzer. While not shown in FIG. 2, alternatively, live data 172, 3-D maps 174, and/or hardware models 176 can be exported to cloud instead of a local PC or GPU and provide user 190 with insights 186.

The Wi-Fi 3D analyzer 180 can use the 3-D maps 174 and hardware models 176 to generate predictions or simulations of wireless signal propagation and their correlation with the live data 172. Based on the data received from the network controller 170, the Wi-Fi 3-D analyzer 180 can provide wireless 3-D rendering 182, simulation 184, and/or insights 188 to the user 190. For example, the user can be provided with the wireless 3-D rendering 182 of the wireless signal coverage (e.g., RF coverage) and options to run simulations 184 for what-if scenarios, and insights 186 including suggestions for improving the network performance associated with the wireless signal coverage. Based on what is provided by the Wi-Fi 3D analyzer 180, the user 190 can take action 188 accordingly, for example, modifying a network configuration to improve the network performance. Wi-Fi 3D analyzer 180 can forward any updates to the network configuration for provisioning 178 to the network controller 170.

Furthermore, the sales tools 160 can provide a product upgrade management based on the communication flow between the sales tools 160, the network controller 170, and the Wi-Fi 3D analyzer 180. The sales tools 160 can transmit new products and lifecycle data 162 to the network controller 170. Then the network controller 170 forwards the new products and lifecycle data 164 to the Wi-Fi 3D analyzer 180. The new products and lifecycle data 162 and 164 can include new product availability for sale or end-of-life dates for AP products.

Based on the new products and lifecycle data 164, the Wi-Fi 3D analyzer 180 can provide upgrade proposals 166, which can include simulation 184 and insights 186 on product upgrade, to the user 190. Also, in response to the upgrade proposals, the user 190 can place a new product order 168 by utilizing the sales tools 160. For example, the new products and lifecycle data 162 can include end-of-life data associated with a particular AP so that an upgrade or replacement of a new AP can be recommended based on the end-of-life data prior to the expiry of the AP. Also, the user 190 can place an order for a new AP with the sales tools 160.

Figure 3:
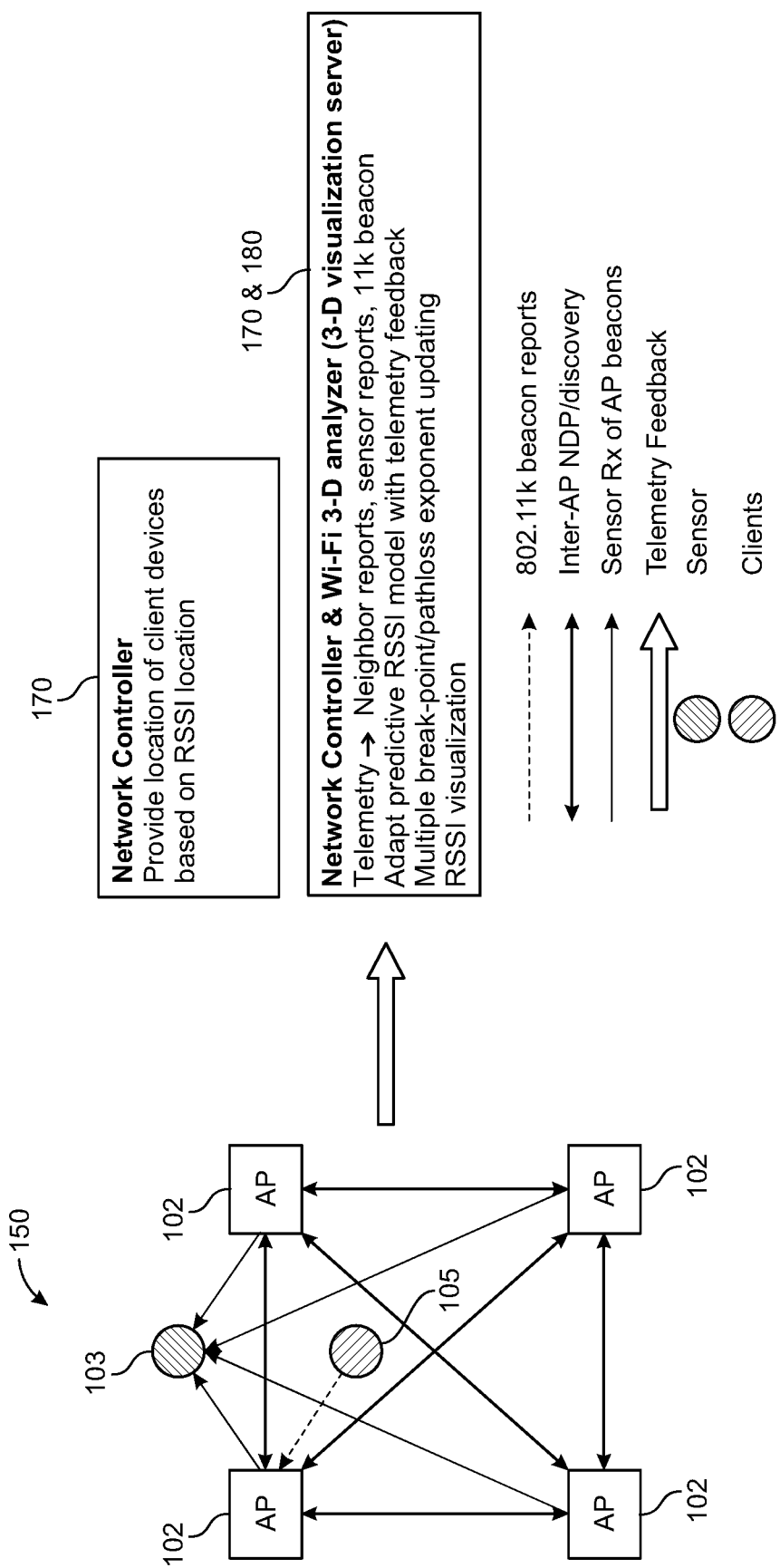
FIG. 3 illustrates an example network architecture diagram of a visualization system for presenting a wireless signal propagation in 3-D according to some aspects of the disclosed technology.

FIG. 3 illustrates an example network architecture diagram for a wireless network 150, a network controller 170, and a Wi-Fi 3-D analyzer 180 according to some aspects of the disclosed technology. The wireless network 150, also illustrated in FIG. 2, comprises APs 102 and sensors 103 and client devices 105.

The wireless network 150 can transmit telemetry feedback (for example, telemetry data 156 illustrated in FIG. 2) to the network controller 170. For example, each AP 102 transmits beacons to the sensor 103 whereby a sensor report can be generated. Also, the APs 102 communicate with each other via inter-AP Neighbor Discovery Protocol (NDP) to generate neighbor reports. Furthermore, client device 105 measures beacons and returns a report with stored beacon information (e.g., 802.11k beacon reports). Based on the neighbor reports, 802.11k beacon reports, and sensor reports, the wireless network 150 provides telemetry feedback to the network controller 170. The telemetry feedback can include information about a distance and azimuth angle between a pair of APs or an AP and a sensor and walls or any obstructions between the pair on a building plan or a floor plan. Also, network controller 170 includes location information of client devices based on RSSI location, which is received from the wireless network 150.

Based on the data provided by the wireless network 150, the network controller 170 and the Wi-Fi 3-D analyzer 180 can determine a predictive RSSI model and visualize the predicted RSSI at all 3-D locations.

Figure 4:
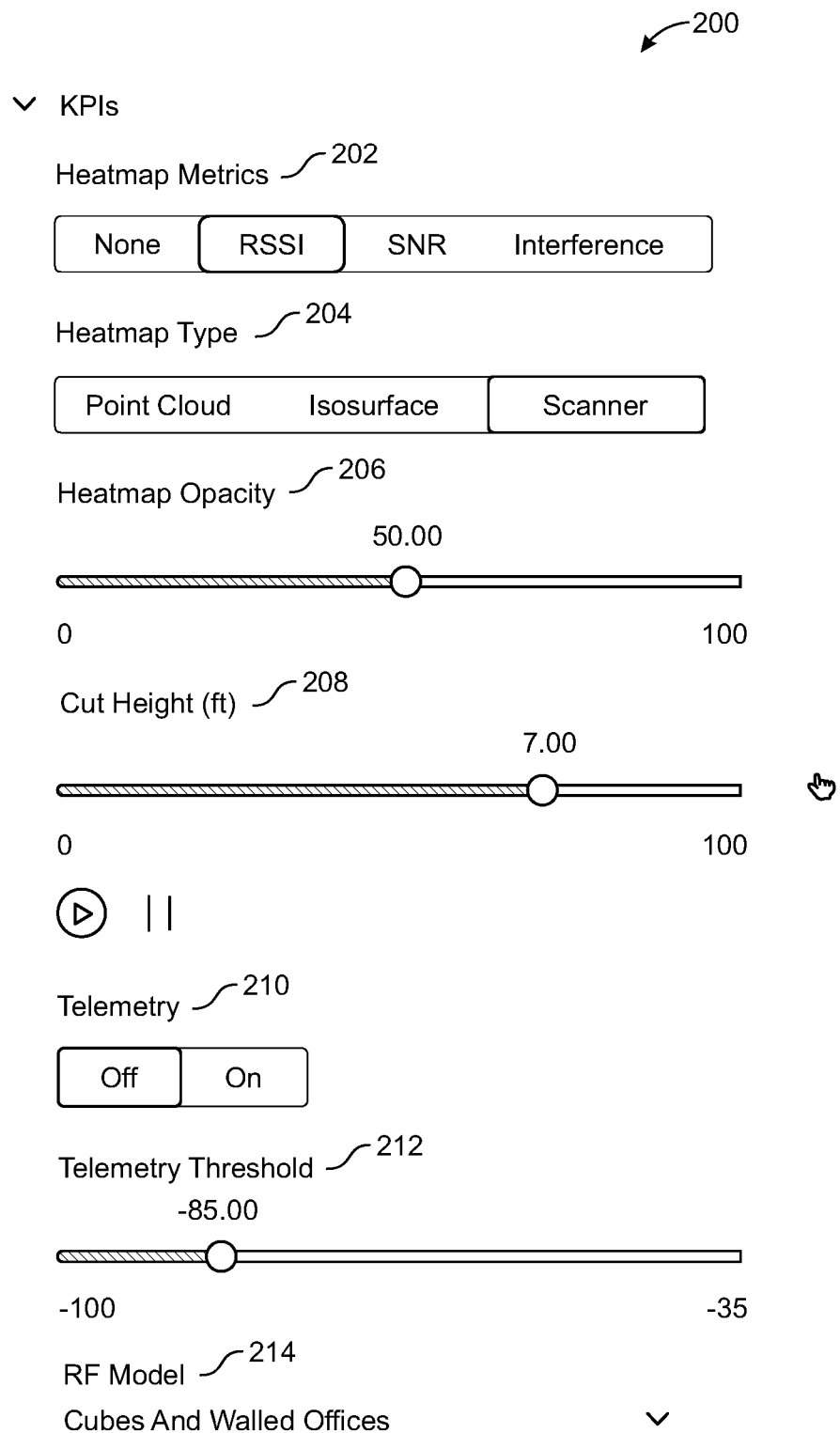
FIG. 4 illustrates an example control menu for a 3-D visualization system according to some aspects of the disclosed technology.

FIG. 4 illustrates an example menu 200 including a list of various parameters that can be adjusted for the 3-D visualization of the wireless signal propagation.

Menu 200 provides an option for key performance indicator (KPI) heatmap metrics 202, for example, none, RSSI, SNR, or Interference. Depending on the selected heatmap metrics, the 3-D visualization of the wireless signal propagation can be presented based on RSSI values, SNR measurements, or interference measurements. RSSI values are a predicted or measured power level at a point in space of an RF transmitted from an AP. Also, SNR measurements are based on the amplitude of signal and noise level. Interference measurements or predictions are based on the power of the interfering signals.

Menu 200 also provides an option for heatmap type 204, for example, point cloud, isosurface, or scanner. A point cloud heatmap provides the 3-D visualization of the wireless signal propagation as a collection of color-coded points where a color variation corresponds to a degree of signal strength. An isosurface heatmap displays the 3-D visualization of the wireless signal propagation with isosurfaces (e.g., contour lines or surfaces) where each isosurface represents points of equal values in a 3-D space. A scanner provides the 3-D visualization of the wireless signal propagation with color-coded bands where the color of the bands corresponds to a degree of signal strength. Also, the scanner allows a user to manipulate a height in the 3-D space, for example, via a height manipulation bar under a cut height 208 so that the wireless signal propagation pattern can be scanned through the 3-D space, for example, from a ground to a ceiling and visualized at varying heights.

Furthermore, a heatmap opacity 206 can be adjusted, for example, in a scale of 0 (i.e., non-transparent) to 100 (i.e., fully transparent) to adjust the transparency of the 3-D visualization.

Also, cut height (ft) 208 can be adjusted, for example, in a scale of 0 to 10. A user can select a particular height where the 3-D visualization is desired. Or, with a play button and a pause button, the 3-D visualization of the wireless signal propagation can be simulated at continuously varying heights from 0 ft to 10 ft.

Menu 200 also provides an option where a visualization of telemetry data 210 can be switched on and off. Also, telemetry threshold 212 can be adjusted, for example, in a scale of −100 to −35.

Furthermore, menu 200 provides an option for a RF Model selection 214. For example, a drop-down list provides various options for the RF model such as cubes and walled offices, drywall offices, or open space.

While not shown in FIG. 4, menu 200 can include different or alternative options. For example, menu 200 could include an option for clipping a 3-D floor plan to take cross-sections of the floor plan to allow clear visualization of an area of interest. Menu 200 could include an adjustable noise floor to be used in calculating a signal-to-noise ratio (SNR). Menu 200 could include an option to change the model of AP being visualized to permit comparisons between various hardware options. Menu 200 could include an option to adjust the frequency band from 2.4 GHz to 5 GHz to visualize attributes associated with RF propagation at those frequencies. The 2.4 GHz band typically provides a greater distance of coverage, while the 5 GHz band typically provides faster communication speeds. Menu 200 can include antennae options that might permit visualizations using directional antennas or omnidirectional antennas. Menu 200 could provide options for adjusting transmission power of an antenna, or a channel. Menu 200 could also provide various sliders for visualizing animations such as a time scale. Accordingly, the menu can provide many options that can vary depending on the type of visualization being presented.

Figure 5:
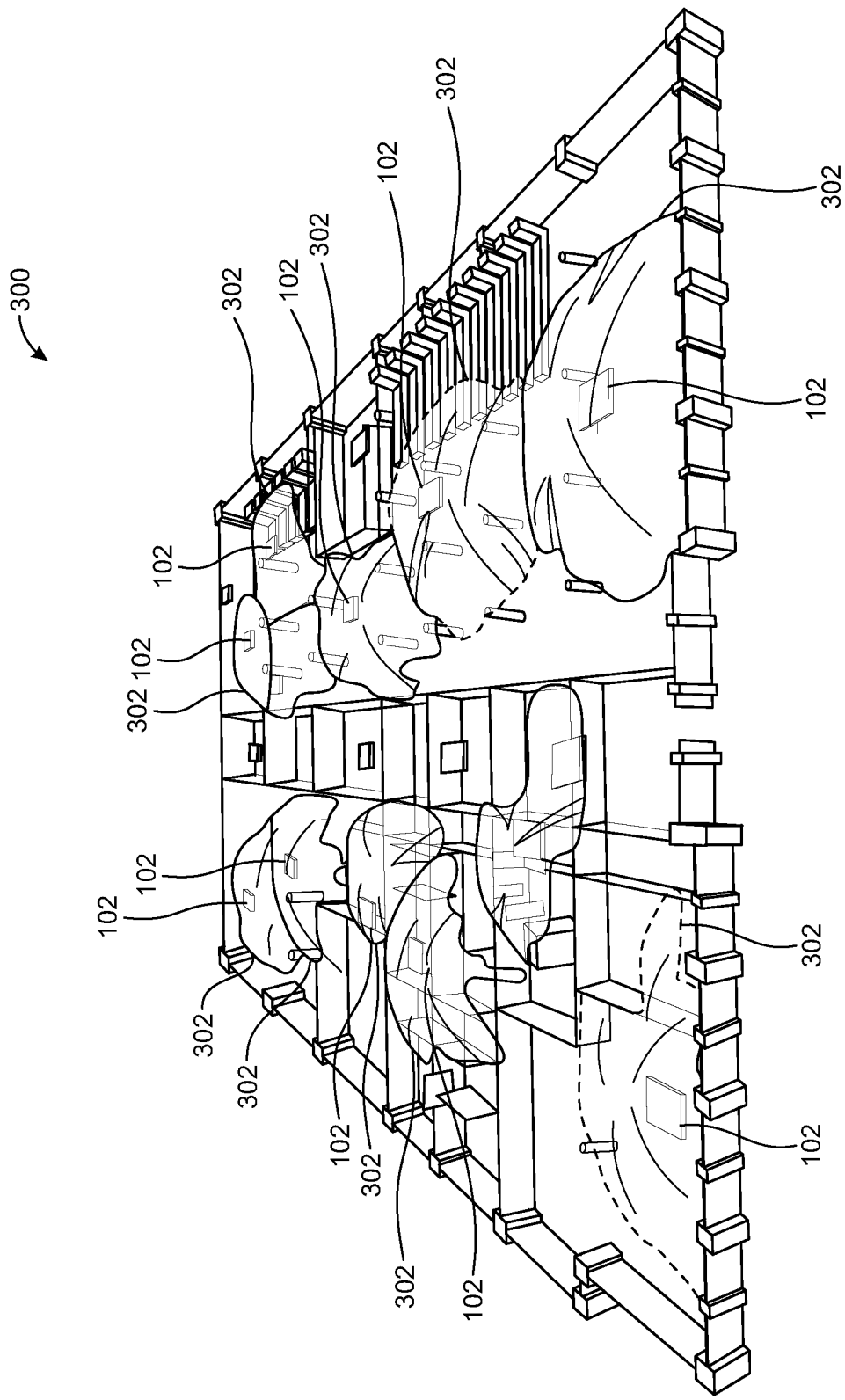
FIG. 5 illustrates an example 3-D visualization of a wireless signal propagation according to some aspects of the disclosed technology.

FIG. 5 illustrates an example 3-D visualization 300 of Wi-Fi AP RF signal propagation. In the 3-D visualization 300, the 3-D visualization of a building plan (e.g., floor plan) is overlaid with RF propagation patterns. As shown in FIG. 5, the 3-D visualization 300 illustrates the RF signal propagation patterns as a collection of zones 302 where each zone represents a service area covered by each AP 102 (e.g., AP 102 illustrated in FIG. 1). Each zone is in the shape of a dome to illustrate a signal strength in the service area in 3-D instead of a simple flat layer in 2-D. Furthermore, the color and size of the domes correspond to a degree of signal strength from the AP in the service area. The dome shape acknowledges that the RF propagation from an AP is not uniform at all heights of a floor plan.

Even though the 3-D visualization 300 of Wi-Fi AP RF signal propagation in FIG. 5 uses a color-coded dome model, the 3-D visualization of the RF signal propagation according to the present disclosure can be provided in the form of a point cloud model, a heat map, or a contour map to illustrate the degree of signal strength in the 3-D space.

Figure 6:
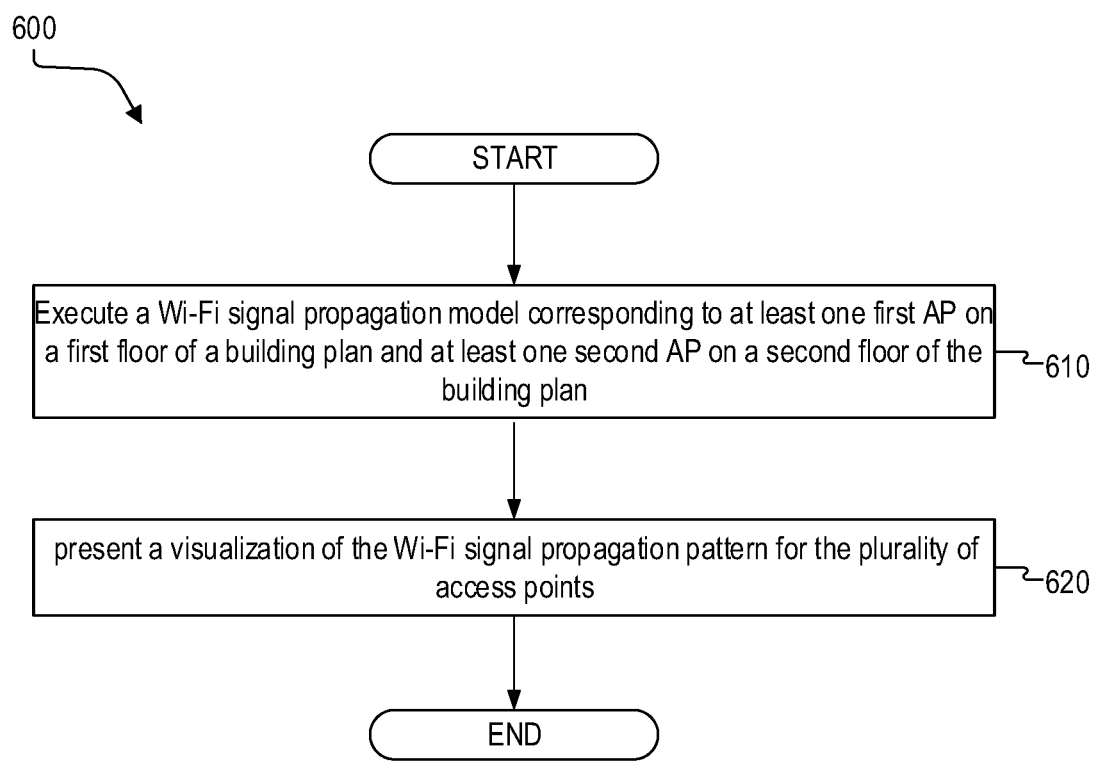
FIG. 6 is a flowchart of an example method for providing a 3-D visualization of wireless signal propagation through multiple floors according to some aspects of the disclosed technology.

FIG. 6 illustrates an example method 600 for providing a 3-D visualization of Wi-Fi AP signal propagation pattern through multiple floors. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes executing a Wi-Fi signal propagation model corresponding to at least one first AP on a first floor of a building plan and at least one second AP on a second floor of the building plan at step 610. For example, the visualization service 108 illustrated in FIG. 1 may execute a Wi-Fi signal propagation model corresponding to at least one first AP on a first floor of a building plan and at least one second AP on a second floor of the building plan.

In some examples, the Wi-Fi signal propagation model calculates a Wi-Fi signal propagation pattern for a plurality of APs including the at least one first AP and the at least one second AP. For example, the visualization service 108 illustrated in FIG. 1 may calculate a RF propagation pattern (i.e., a Wi-Fi signal propagation pattern) for at least one Wi-Fi AP 102 (e.g., the at least one first AP on the first floor or the at least one second AP on the second floor) based on the Wi-Fi signal propagation model for at least one Wi-Fi AP, the antenna pattern of the Wi-Fi AP, the configuration of the Wi-Fi AP (txPower, azimuth angle, elevation, band, and channel), and the geometry of space as defined in a building plan.

Figure 7:
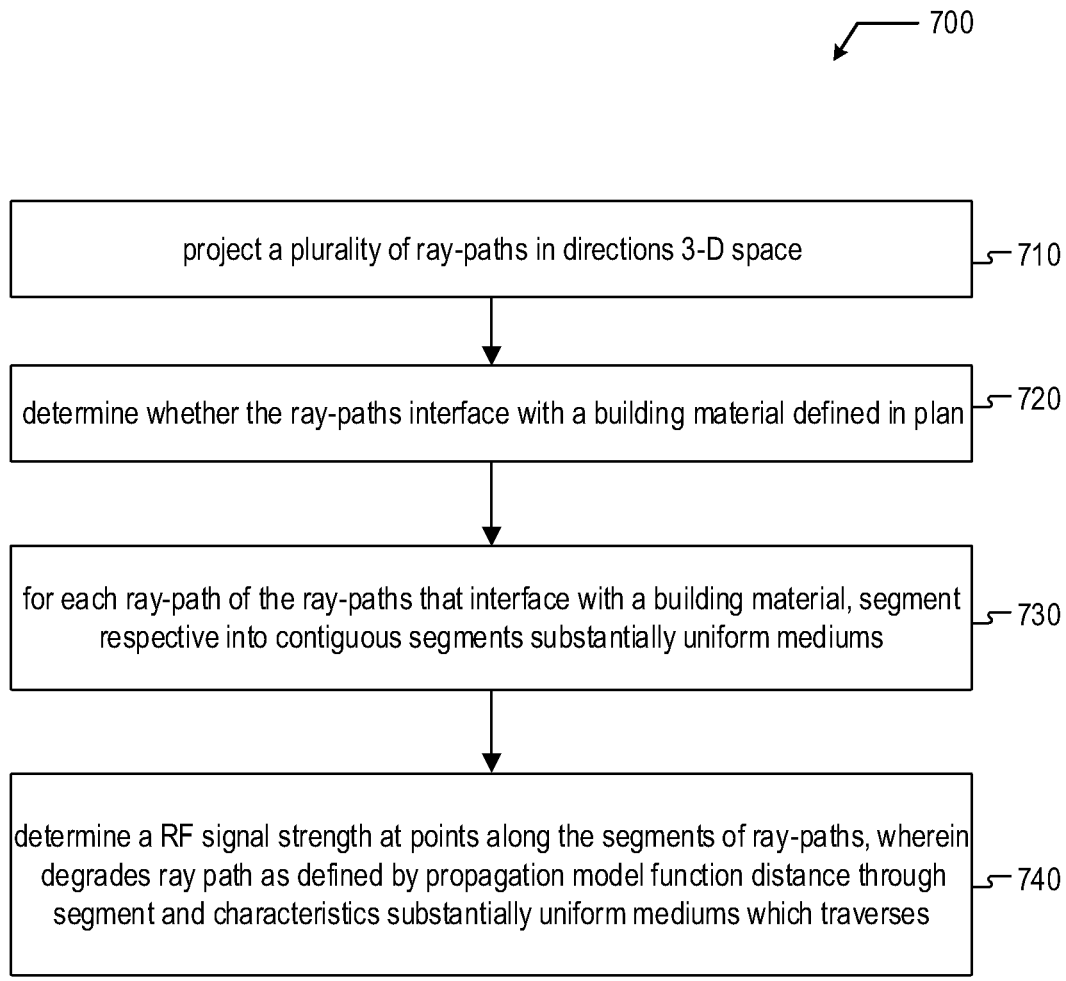
FIG. 7 is a flowchart of an example method for determining a radio frequency (RF) signal strength at points distributed in a 3-D space according to some aspects of the disclosed technology.

An example method 700 for the calculating the 3-D Wi-Fi signal propagation pattern (i.e., 3-D RF propagation model) is illustrated in FIG. 7. The method 700 includes projecting a plurality of ray-paths in a plurality of directions in a 3-D space at block 710. For example, the ray tracing service 110 illustrated in FIG. 1 may project a plurality of ray-paths in a plurality of directions in a 3-D space. In some embodiments, the ray-paths originate from the Wi-Fi AP and emanate in a variety of X, Y, and Z planes.

The method 700 includes determining whether the ray-paths interface with a building material defined in a building plan at block 720. For example, the ray tracing service 110 illustrated in FIG. 1 may determine whether the ray-paths interface with a building material defined in a building plan.

The method 700 includes segmenting each ray-path of the ray-paths that interface with a building material the respective ray-path into contiguous segments of substantially uniform mediums at block 730. For example, the ray tracing service 110 illustrated in FIG. 1 may segment the respective ray-path into contiguous segments of substantially uniform mediums.

The ray tracing service 110 can provide the segmented ray paths to an AP model service 106. The combination of the collection of ray paths for any AP and model information from AP model service 106 can be provided to visualization service 108.

The method 700 includes determining a RF signal strength at points along the segments of the ray-paths at block 740. For example, the visualization service 108 illustrated in FIG. 1 may determine a RF signal strength (i.e., wireless signal strength or Wi-Fi signal strength) at points along the segments of the ray-paths. The visualization service 108 can use the information about the collection of ray paths for any AP and a RF propagation model particular to the type of AP and the parameters for the specification AP to determine the RF signal strength at points along the segments of the ray-paths. In some embodiments, the signal degrades along the ray path as defined by the RF propagation model as a function of distance through the segment and characteristics of RF propagation pattern through the substantially uniform mediums through which the segment traverses.

In some examples, the substantially uniform mediums include open space, concrete, glass, wood, metal, non-metal, glass, liquid, or other materials. Depending on the type of materials, the ray-path interfaces in a different way, which results in varying RF signal strengths at points along the segments.

Referring to FIG. 6, according to some examples, the method 600 includes presenting a visualization of the Wi-Fi signal propagation pattern for the plurality of APs at step 620. In some instances, the plurality of APs includes the at least one first AP on the first floor and the at least one second AP on the second floor. For example, the visualization service 108 illustrated in FIG. 1 may present a visualization of the Wi-Fi signal propagation pattern for the plurality of APs including the at least one first AP and the at least one second AP.

Figure 8:
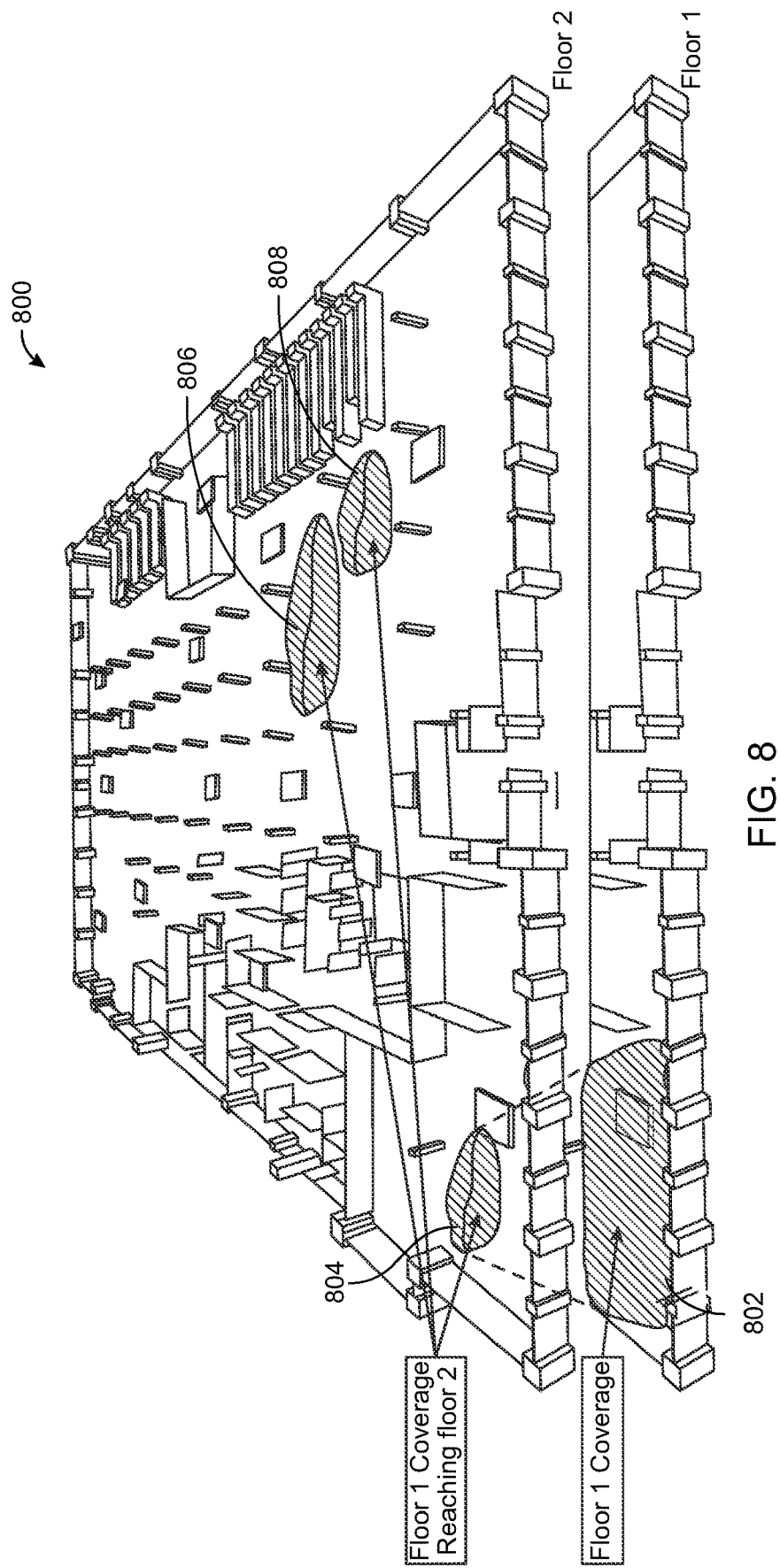
FIG. 8 illustrates an example 3-D visualization of wireless signal propagation through multiple floors according to some aspects of the disclosed technology.

In some examples, the Wi-Fi signal propagation pattern for the at least one first AP on the first floor of the building plan projects onto the second floor of the building plan. In FIG. 8, the 3-D visualization 800 of Wi-Fi signal propagation illustrates the Wi-Fi coverage through multiple floors (e.g., Floor 1 and Floor 2). As shown in FIG. 8, the Wi-Fi propagation pattern 802 from an AP on Floor 1 projects onto Floor 2 of the building plan. The Wi-Fi coverage (i.e., wireless AP signal propagation) from an AP located on Floor 1 reaches Floor 2 and provides Wi-Fi coverage 804 on Floor 2. Also, Wi-Fi coverage 806 and 808 on Floor 2 are projected from APs located on Floor 1.

In some instances, the visualization of the Wi-Fi signal propagation pattern for the plurality of APs illustrates the first floor of the building plan showing a volume where the Wi-Fi signal propagation pattern for the at least one second AP on the second floor of the building plan projects onto the first floor. For example, the 3-D visualization of the Wi-Fi signal propagation pattern can include a Wi-Fi coverage that appears on the first floor (Floor 1), which is projected from an AP placed on the second floor (Floor 2). The Wi-Fi coverage on the first floor can be represented in a 3-D volume in the visualization.

According to some examples, the method 600 further includes detecting one or more overlapping portions within the building plan where the Wi-Fi signal propagation pattern for the at least one first AP on the first floor and the Wi-Fi signal propagation pattern for the at least one second AP on the second floor overlap. For example, the visualization service 108 illustrated in FIG. 1 may detect one or more overlapping portions within the building plan where the Wi-Fi signal propagation pattern for the at least one first AP on the first floor and the Wi-Fi signal propagation pattern for the at least one second AP on the second floor overlap.

According to some examples, the method 600 includes marking the one or more overlapping portions within the building plan in the visualization of the Wi-Fi signal propagation pattern for the plurality of APs. For example, the visualization service 108 illustrated in FIG. 1 may mark the one or more overlapping portions within the building plan in the visualization of the Wi-Fi signal propagation pattern for the plurality of APs.

In some instances, any interference or attenuation on the current floor due to the Wi-Fi signal propagation from other floors can be determined based on the marking of the one or more overlapping portions.

Also, the marking of the one or more overlapping portions can provide the severity of the impact from the Wi-Fi coverage from other floors to the Wi-Fi coverage on the current floor. For example, the marking of the one or more overlapping portions can be color-coded or represented in a different shape or pattern depending on the degree of the interference.

According to some examples, the method 600 further comprises determining that a Wi-Fi signal strength in the one or more overlapping portions within the building plan is lower than a threshold. For example, the visualization service 108 illustrated in FIG. 1 may determine that a Wi-Fi signal strength in the one or more overlapping portions within the building plan is lower than a threshold.

In some instances, a user interface can be provided to allow a user to manage and control the threshold to simulate the change of the Wi-Fi coverage based on varying thresholds. For example, the user interface service 130 as illustrated in FIG. 1 can provide a user with an option to adjust the threshold for areas in which the Wi-Fi coverage is lower than the threshold.

Further, the method 600 comprises providing one or more suggestions to improve the Wi-Fi signal strength so that the Wi-Fi signal strength in the one or more overlapping portions is over the threshold. For example, the visualization service 108 illustrated in FIG. 1 may provide one or more suggestions to increase the Wi-Fi signal strength in the one or more overlapping portions over the threshold.

In some instances, the one or more suggestions are based on data associated with power, frequency, and channel of the APs. For example, wireless network 150 as illustrated in FIG. 2 can provide sensors data 152, assurance data 154, or telemetry data 156, all of which can be associated with characteristics of each of the APs 102. Based on such data, Wi-Fi 3D analyzer 180 may provide insights 186 to user 190 including the one or more suggestions on how to improve the Wi-Fi signal strength and optimize the Wi-Fi coverage.

In some examples, the one or more suggestions include a change in a configuration of the at least one first AP or the at least one second AP. For example, the optimization service 118 illustrated in FIG. 1 can provide a suggestion where the Wi-Fi coverage can be optimized in terms of network configuration.

Furthermore, the method 600 includes determining that, within the one or more overlapping portions on the second floor of the building plan, a Wi-Fi signal strength from the at least one first AP on the first floor is stronger than a Wi-Fi signal strength from the at least one second AP on the second floor. For example, the visualization service 108 illustrated in FIG. 1 may determine that within the one or more overlapping portions located on the second floor, a signal strength from an AP located on the first floor is stronger than a signal strength from an AP located on the second floor.

In some examples, the visualization of the Wi-Fi signal propagation pattern can include a visual representation of the one or more overlapping portions on the second floor when a signal strength from an AP located on the first floor is stronger than a signal strength from an AP located on the second floor within the one or more overlapping portions.

According to some examples, the method 600 includes detecting interference in the Wi-Fi signal propagation pattern for the at least one first AP on the first floor, wherein the interference is caused by one or more objects located on the second floor. For example, the visualization service 108 illustrated in FIG. 1 may detect interference in the Wi-Fi signal propagation pattern for the at least one first AP on the first floor where the interference is caused by one or more objects located on the second floor.

In some instances, not only the APs on other floors or the Wi-Fi signal propagation from the APs on the other floor, but also objects or obstacles located on the other floor (e.g., Floor 2) can impact the Wi-Fi signal propagation pattern on the current floor (e.g., Floor 1).

In some examples, the impact on the Wi-Fi signal propagation pattern on the current floor can vary depending on a type of materials of the objects or obstacles located on the other floor (e.g., open space, concrete, glass, wood, metal, non-metal, glass, liquid, or other materials).

According to some examples, the method 600 includes providing one or more proposals to account for the interference in the Wi-Fi signal propagation pattern for the at least one first AP on the first floor caused by the one or more objects located on the second floor. For example, the visualization service 108 illustrated in FIG. 1 may provide one or more proposals to account for the interference in the Wi-Fi signal propagation pattern for the at least one first AP on the first floor caused by the one or more objects located on the second floor.

In some examples, the visualization service 108 illustrated in FIG. 1 may include identification of the type of the materials of the objects or obstacles located on the floor. Furthermore, the optimization service 118 illustrated in FIG. 1 may provide a proposal regarding the location of the objects and obstacles or location of the APs based on the information associated with the type of materials of the objects.

According to some examples, an impact of signal leakage (e.g., RF leakage) can be identified and estimated based on telemetry feedback. For example, an atrium or other interfloor RF conduits can cause the signal leakage within the building plan. Based on telemetry feedback from APs 102 and sensor(s) 105 as illustrated in FIG. 3, the network controller 170 or Wi-Fi 3-D analyzer 180 can identify and estimate the impact of the signal leakage.

In some instances, the 3-D visualization of the Wi-Fi signal propagation pattern can include a visual representation of the impact of the signal leakage. For example, the visualization service 108 illustrated in FIG. 2 may include a visual representation of the signal leakage, wherein the impact of signal leakage can be determined based on telemetry feedback.

Figure 9:
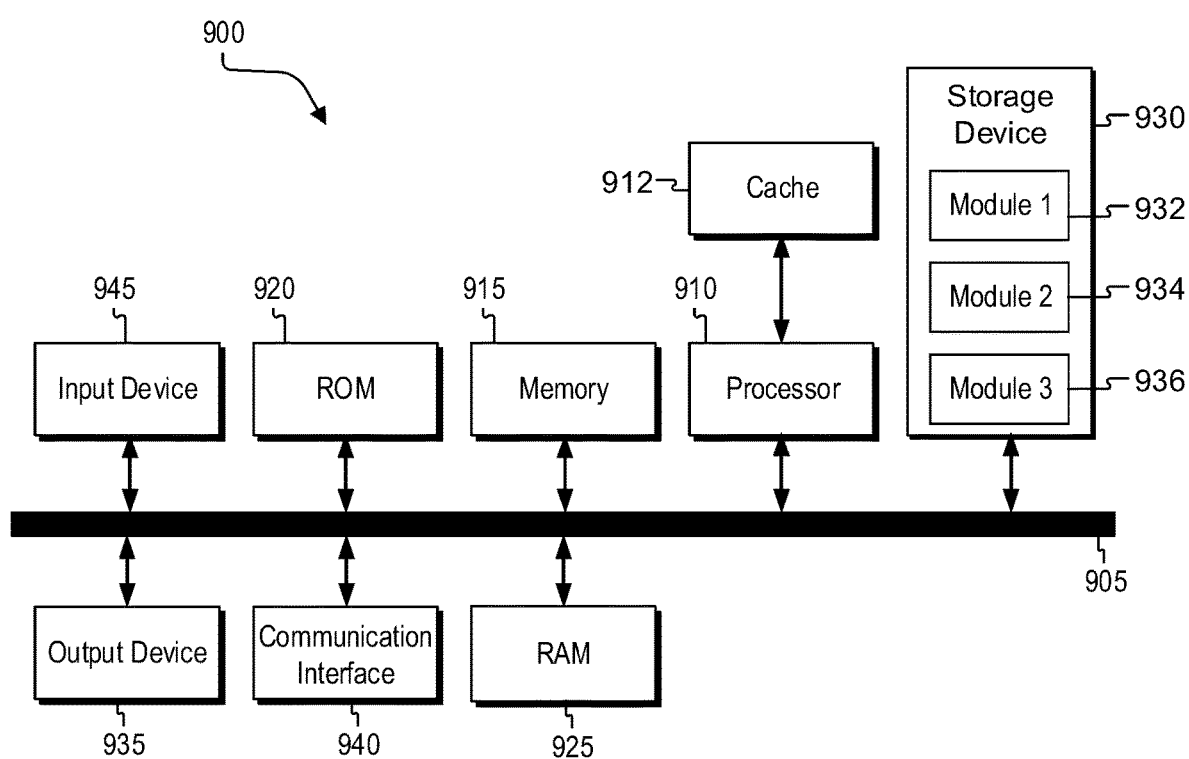
FIG. 9 shows an example of computing system for implementing certain aspects of the present technology.

FIG. 9 shows an example of computing system 900, which can be for example any computing device making up 3-D signal propagation visualization system 100, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: A method for visualizing a Wi-Fi access point signal propagation pattern through multiple floors of a building plan, the method comprising: executing a Wi-Fi signal propagation model corresponding to at least one first access point on a first floor of a building plan and at least one second access point on a second floor of the building plan, wherein the Wi-Fi signal propagation model calculates a Wi-Fi signal propagation pattern for a plurality of access points including the at least one first access point and the at least one second access point; and presenting a visualization of the Wi-Fi signal propagation pattern for the plurality of access points, wherein the Wi-Fi signal propagation pattern for the at least one first access point on the first floor of the building plan projects onto the second floor of the building plan.

Aspect 2: The method of Aspect 1, further comprising: detecting one or more overlapping portions within the building plan where the Wi-Fi signal propagation pattern for the at least one first access point on the first floor and the Wi-Fi signal propagation pattern for the at least one second access point on the second floor overlap; and marking the one or more overlapping portions within the building plan in the visualization of the Wi-Fi signal propagation pattern for the plurality of access points.

Aspect 3: The method of any of Aspects 1 to 2, further comprising: determining that a Wi-Fi signal strength in the one or more overlapping portions within the building plan is lower than a threshold; and providing one or more suggestions to increase the Wi-Fi signal strength in the one or more overlapping portions over the threshold.

Aspect 4: The method of any of Aspects 1 to 3, wherein the one or more suggestions include a change in a configuration of the at least one first access point or the at least one second access point.

Aspect 5: The method of any of Aspects 1 to 4, wherein the visualization of the Wi-Fi signal propagation pattern for the plurality of access points illustrates the first floor of the building plan showing a volume where the Wi-Fi signal propagation pattern for the at least one second access point on the second floor of the building plan projects onto the first floor.

Aspect 6: The method of any of Aspects 1 to 5, wherein the Wi-Fi signal propagation model calculates the Wi-Fi signal propagation pattern for the plurality of access points by: projecting a plurality of ray-paths in a plurality of directions in a 3-D space, wherein the ray-paths originate from each of the plurality of access points and emanate in a variety of X, Y, and Z planes; determining whether the ray-paths interface with one or more materials defined in the building plan; for each ray-path of the ray-paths that interface with the one or more materials defined in the building plan, segmenting the respective ray-path into contiguous segments of substantially uniform mediums; and determining a Wi-Fi signal strength at points along the contiguous segments of the ray-paths, wherein the Wi-Fi signal strength degrades along the contiguous segments of the ray-paths as defined by the Wi-Fi signal propagation model as a function of distance through the contiguous segments and characteristics of the Wi-Fi signal propagation pattern through the substantially uniform mediums through which the contiguous segments traverse.

Aspect 7: The method of any of Aspects 1 to 6, further comprising: detecting interference in the Wi-Fi signal propagation pattern for the at least one first access point on the first floor, wherein the interference is caused by one or more objects located on the second floor.

Aspect 8: The method of any of Aspects 1 to 7, further comprising: providing one or more proposals to account for the interference in the Wi-Fi signal propagation pattern for the at least one first access point on the first floor caused by the one or more objects located on the second floor.

Aspect 9: The method of any of Aspects 1 to 8, further comprising: providing one or more proposals to account for the interference in the Wi-Fi signal propagation pattern for the at least one first access point on the first floor caused by the one or more objects located on the second floor.

Aspect 10: A system for visualizing a Wi-Fi signal propagation pattern through multiple floors, comprising: a storage configured to store instructions; a processor configured to execute the instructions and cause the processor to: execute a Wi-Fi signal propagation model corresponding to at least one first access point on a first floor of a building plan and at least one second access point on a second floor of the building plan, wherein the Wi-Fi signal propagation model calculates a Wi-Fi signal propagation pattern for a plurality of access points including the at least one first access point and the at least one second access point, and present a visualization of the Wi-Fi signal propagation pattern for the plurality of access points, wherein the Wi-Fi signal propagation pattern for the at least one first access point on the first floor of the building plan projects onto the second floor of the building plan.

Aspect 11: The system of Aspect 10, wherein the processor is configured to execute the instructions and cause the processor to: detect one or more overlapping portions within the building plan where the Wi-Fi signal propagation pattern for the at least one first access point on the first floor and the Wi-Fi signal propagation pattern for the at least one second access point on the second floor overlap; and mark the one or more overlapping portions within the building plan in the visualization of the Wi-Fi signal propagation pattern for the plurality of access points.

Aspect 12: The system of any of Aspects 10 to 11, wherein the processor is configured to execute the instructions and cause the processor to: determine that a Wi-Fi signal strength in the one or more overlapping portions within the building plan is lower than a threshold; and provide one or more suggestions to increase the Wi-Fi signal strength in the one or more overlapping portions over the threshold.

Aspect 13: The system of any of Aspects 10 to 12, wherein the one or more suggestions include a change in a configuration of the at least one first access point or the at least one second access point.

Aspect 14: The system of any of Aspects 10 to 13, wherein the visualization of the Wi-Fi signal propagation pattern for the plurality of access points illustrates the first floor of the building plan showing a volume where the Wi-Fi signal propagation pattern for the at least one second access point on the second floor of the building plan projects onto the first floor.

Aspect 15: The system of any of Aspects 10 to 14, wherein the Wi-Fi signal propagation model calculates the Wi-Fi signal propagation pattern for the plurality of access points by: projecting a plurality of ray-paths in a plurality of directions in a 3-D space, wherein the ray-paths originate from each of the plurality of access points and emanate in a variety of X, Y, and Z planes; determining whether the ray-paths interface with one or more materials defined in the building plan; for each ray-path of the ray-paths that interface with the one or more materials defined in the building plan, segmenting the respective ray-path into contiguous segments of substantially uniform mediums; and determining a Wi-Fi signal strength at points along the contiguous segments of the ray-paths, wherein the Wi-Fi signal strength degrades along the contiguous segments of the ray-paths as defined by the Wi-Fi signal propagation model as a function of distance through the contiguous segments and characteristics of the Wi-Fi signal propagation pattern through the substantially uniform mediums through which the contiguous segments traverse.

Aspect 16: The system of any of Aspects 10 to 15, wherein the processor is configured to execute the instructions and cause the processor to: detect interference in the Wi-Fi signal propagation pattern for the at least one first access point on the first floor, wherein the interference is caused by one or more objects located on the second floor.

Aspect 17: The system of any of Aspects 10 to 16, wherein the processor is configured to execute the instructions and cause the processor to: provide one or more proposals to account for the interference in the Wi-Fi signal propagation pattern for the at least one first access point on the first floor caused by the one or more objects located on the second floor.

Aspect 18: The system of any of Aspects 10 to 17, wherein the processor is configured to execute the instructions and cause the processor to: provide one or more proposals to account for the interference in the Wi-Fi signal propagation pattern for the at least one first access point on the first floor caused by the one or more objects located on the second floor.

Aspect 19: A non-transitory computer readable medium comprising instructions, the instructions, when executed by a computing system, cause the computing system to: execute a Wi-Fi signal propagation model corresponding to at least one first access point on a first floor of a building plan and at least one second access point on a second floor of the building plan, wherein the Wi-Fi signal propagation model calculates a Wi-Fi signal propagation pattern for a plurality of access points including the at least one first access point and the at least one second access point; and present a visualization of the Wi-Fi signal propagation pattern for the plurality of access points, wherein the Wi-Fi signal propagation pattern for the at least one first access point on the first floor of the building plan projects onto the second floor of the building plan.

Aspect 20: The computer readable medium of Aspect 19, wherein the computer readable medium further comprises instructions that, when executed by the computing system, cause the computing system to: detect one or more overlapping portions within the building plan where the Wi-Fi signal propagation pattern for the at least one first access point on the first floor and the Wi-Fi signal propagation pattern for the at least one second access point on the second floor overlap; and mark the one or more overlapping portions within the building plan in the visualization of the Wi-Fi signal propagation pattern for the plurality of access points.

Aspect 21: The computer readable medium of any of Aspects 19 to 20, wherein the computer readable medium further comprises instructions that, when executed by the computing system, cause the computing system to: determine that a Wi-Fi signal strength in the one or more overlapping portions within the building plan is lower than a threshold; and provide one or more suggestions to increase the Wi-Fi signal strength in the one or more overlapping portions over the threshold.

Aspect 22: The computer readable medium of any of Aspects 19 to 21, wherein the one or more suggestions include a change in a configuration of the at least one first access point or the at least one second access point.

Aspect 23: The computer readable medium of any of Aspects 19 to 22, wherein the visualization of the Wi-Fi signal propagation pattern for the plurality of access points illustrates the first floor of the building plan showing a volume where the Wi-Fi signal propagation pattern for the at least one second access point on the second floor of the building plan projects onto the first floor.

Aspect 24: The computer readable medium of any of Aspects 19 to 23, wherein the Wi-Fi signal propagation model calculates the Wi-Fi signal propagation pattern for the plurality of access points by: projecting a plurality of ray-paths in a plurality of directions in a 3-D space, wherein the ray-paths originate from each of the plurality of access points and emanate in a variety of X, Y, and Z planes; determining whether the ray-paths interface with one or more materials defined in the building plan; for each ray-path of the ray-paths that interface with the one or more materials defined in the building plan, segmenting the respective ray-path into contiguous segments of substantially uniform mediums; and determining a Wi-Fi signal strength at points along the contiguous segments of the ray-paths, wherein the Wi-Fi signal strength degrades along the contiguous segments of the ray-paths as defined by the Wi-Fi signal propagation model as a function of distance through the contiguous segments and characteristics of the Wi-Fi signal propagation pattern through the substantially uniform mediums through which the contiguous segments traverse.

Aspect 25: The computer readable medium of any of Aspects 19 to 24, wherein the computer readable medium further comprises instructions that, when executed by the computing system, cause the computing system to: detect interference in the Wi-Fi signal propagation pattern for the at least one first access point on the first floor, wherein the interference is caused by one or more objects located on the second floor.

Aspect 26: The computer readable medium of any of Aspects 19 to 25, wherein the computer readable medium further comprises instructions that, when executed by the computing system, cause the computing system to: provide one or more proposals to account for the interference in the Wi-Fi signal propagation pattern for the at least one first access point on the first floor caused by the one or more objects located on the second floor.

Aspect 27: The computer readable medium of any of Aspects 19 to 26, wherein the computer readable medium further comprises instructions that, when executed by the computing system, cause the computing system to: provide one or more proposals to account for the interference in the Wi-Fi signal propagation pattern for the at least one first access point on the first floor caused by the one or more objects located on the second floor.

What is claimed is:

1. A method for visualizing a Wi-Fi signal propagation pattern for a plurality of access points, comprising:
    projecting a plurality of ray-paths in a plurality of directions in a 3-D space, wherein the plurality of ray-paths originate from each of the plurality of access points and emanate in a variety of X, Y, and Z planes;
    determining whether the plurality of ray-paths interface with one or more materials defined in a building plan;
    for each ray-path of the plurality of ray-paths that interface with the one or more materials defined in the building plan, segmenting the respective ray-path into contiguous segments of substantially uniform mediums; and
    determining a Wi-Fi signal strength at points along the contiguous segments of the plurality of ray-paths, wherein the Wi-Fi signal strength degrades along the contiguous segments of the plurality of ray-paths as a function of distance.

2. The method of claim 1, further comprising:
    detecting one or more overlapping portions within the building plan where the Wi-Fi signal propagation pattern for at least one first access point on a first floor and the Wi-Fi signal propagation pattern for at least one second access point on a second floor overlap; and
    marking the one or more overlapping portions within the building plan in a visualization of the Wi-Fi signal propagation pattern for the plurality of access points.

3. The method of claim 2, further comprising:
    determining that the Wi-Fi signal strength in the one or more overlapping portions within the building plan is lower than a threshold; and
    providing one or more suggestions to increase the Wi-Fi signal strength in the one or more overlapping portions over the threshold.

4. The method of claim 3, wherein the one or more suggestions include a change in a configuration of the at least one first access point or the at least one second access point.

5. The method of claim 2, further comprising:
determining that, within the one or more overlapping portions on the second floor of the building plan, the Wi-Fi signal strength from the at least one first access point on the first floor is stronger than the Wi-Fi signal strength from the at least one second access point on the second floor.

6. The method of claim 1, wherein a visualization of the Wi-Fi signal propagation pattern for the plurality of access points illustrates a first floor of the building plan showing a volume where the Wi-Fi signal propagation pattern for at least one second access point on a second floor of the building plan projects onto the first floor.

7. The method of claim 1, wherein the Wi-Fi signal strength degrades along the contiguous segments of the plurality of ray-paths as a function of distance through the contiguous segments and characteristics of the Wi-Fi signal propagation pattern through the contiguous segments of substantially uniform mediums through which the contiguous segments traverse.

8. The method of claim 1, further comprising:
detecting interference in the Wi-Fi signal propagation pattern for at least one first access point on a first floor, wherein the interference is caused by one or more objects located on a second floor.

9. A system for visualizing a Wi-Fi signal propagation pattern for a plurality of access points comprising:
a storage configured to store instructions; and
a processor configured to execute the instructions and cause the processor to:
project a plurality of ray-paths in a plurality of directions in a 3-D space, wherein the plurality of ray-paths originate from each of the plurality of access points and emanate in a variety of X, Y, and Z planes;
determine whether the plurality of ray-paths interface with one or more materials defined in a building plan;
for each ray-path of the plurality of ray-paths that interface with the one or more materials defined in the building plan, segment the respective ray-path into contiguous segments of substantially uniform mediums; and
determine a Wi-Fi signal strength at points along the contiguous segments of the plurality of ray-paths, wherein the Wi-Fi signal strength degrades along the contiguous segments of the plurality of ray-paths as a function of distance.

10. The system of claim 9, wherein the processor is configured to execute the instructions and cause the processor to:
detect one or more overlapping portions within the building plan where the Wi-Fi signal propagation pattern for at least one first access point on a first floor and the Wi-Fi signal propagation pattern for at least one second access point on a second floor overlap; and
mark the one or more overlapping portions within the building plan in the visualization of the Wi-Fi signal propagation pattern for the plurality of access points.

11. The system of claim 10, wherein the processor is configured to execute the instructions and cause the processor to:
determine that the Wi-Fi signal strength in the one or more overlapping portions within the building plan is lower than a threshold; and
provide one or more suggestions to increase the Wi-Fi signal strength in the one or more overlapping portions over the threshold.

12. The system of claim 11, wherein the one or more suggestions include a change in a configuration of the at least one first access point or the at least one second access point.

13. The system of claim 10, wherein the processor is configured to execute the instructions and cause the processor to:
determine that, within the one or more overlapping portions on a second floor of the building plan, the Wi-Fi signal strength from the at least one first access point on a first floor is stronger than the Wi-Fi signal strength from the at least one second access point on the second floor.

14. The system of claim 9, wherein a visualization of the Wi-Fi signal propagation pattern for the plurality of access points illustrates a first floor of the building plan showing a volume where the Wi-Fi signal propagation pattern for at least one second access point on a second floor of the building plan projects onto the first floor.

15. The system of claim 9, wherein the Wi-Fi signal strength degrades along the contiguous segments of the plurality of ray-paths as a function of distance through the contiguous segments and characteristics of the Wi-Fi signal propagation pattern through the contiguous segments of substantially uniform mediums through which the contiguous segments traverse.

16. The system of claim 9, wherein the processor is configured to execute the instructions and cause the processor to:
detect interference in the Wi-Fi signal propagation pattern for at least one first access point on a first floor, wherein the interference is caused by one or more objects located on a second floor.

17. The system of claim 16, wherein the processor is configured to execute the instructions and cause the processor to:
provide one or more proposals to account for the interference in the Wi-Fi signal propagation pattern for the at least one first access point on the first floor caused by the one or more objects located on the second floor.

18. A non-transitory computer readable medium comprising instructions, the instructions, when executed by a computing system, cause the computing system to:
project a plurality of ray-paths in a plurality of directions in a 3-D space, wherein the plurality of ray-paths originate from each of a plurality of access points and emanate in a variety of X, Y, and Z planes;
determine whether the plurality of ray-paths interface with one or more materials defined in a building plan;
for each ray-path of the plurality of ray-paths that interface with the one or more materials defined in the building plan, segment the respective ray-path into contiguous segments of substantially uniform mediums; and
determine a Wi-Fi signal strength at points along the contiguous segments of the plurality of ray-paths, wherein the Wi-Fi signal strength degrades along the contiguous segments of the plurality of ray-paths as a function of distance.

19. The non-transitory computer readable medium of claim 18, wherein the non-transitory computer readable medium further comprises instructions that, when executed by the computing system, cause the computing system to:
- detect one or more overlapping portions within the building plan where the Wi-Fi signal propagation pattern for at least one first access point on a first floor and the Wi-Fi signal propagation pattern for at least one second access point on a second floor overlap; and
- mark the one or more overlapping portions within the building plan in a visualization of the Wi-Fi signal propagation pattern for the plurality of access points.

20. The non-transitory computer readable medium of claim 19, wherein the non-transitory computer readable medium further comprises instructions that, when executed by the computing system, cause the computing system to:
- determine that the Wi-Fi signal strength in the one or more overlapping portions within the building plan is lower than a threshold; and
- provide one or more suggestions to increase the Wi-Fi signal strength in the one or more overlapping portions over the threshold.

* * * * *